April 20, 1954  H. A. JEWETT  2,675,730
KEYBOARD MUSICAL INSTRUMENT
Filed Nov. 12, 1948  8 Sheets-Sheet 1

Inventor
Harold A. Jewett.

April 20, 1954     H. A. JEWETT     2,675,730
KEYBOARD MUSICAL INSTRUMENT Filed Nov. 12, 1948     8 Sheets-Sheet 2

Inventor
Harold A. Jewett

April 20, 1954   H. A. JEWETT   2,675,730
KEYBOARD MUSICAL INSTRUMENT
Filed Nov. 12, 1948   8 Sheets-Sheet 3

Inventor
Harold A. Jewett.

April 20, 1954     H. A. JEWETT     2,675,730
KEYBOARD MUSICAL INSTRUMENT

Filed Nov. 12, 1948     3 Sheets-Sheet 5

Inventor
Harold A. Jewett

April 20, 1954  H. A. JEWETT  2,675,730
KEYBOARD MUSICAL INSTRUMENT
Filed Nov. 12, 1948  8 Sheets-Sheet 6

April 20, 1954     H. A. JEWETT     2,675,730
KEYBOARD MUSICAL INSTRUMENT Filed Nov. 12, 1948     8 Sheets-Sheet 8

Patented Apr. 20, 1954

2,675,730

UNITED STATES PATENT OFFICE 2,675,730

KEYBOARD MUSICAL INSTRUMENT

Harold A. Jewett, Washington, D. C.

Application November 12, 1948, Serial No. 59,512

9 Claims. (Cl. 84—427)

The invention relates to keyboard musical instruments of the piano, organ, etc. type.

Objects of the invention include the provision of novel designs and arrangements of keys, key actions, manuals and appurtenances, as well as novel supports for them, with a general view to enhancing efficiency in the use of space at the console.

Non-restrictively, and as in illustrative starting point, a particular embodiment of the invention may be referred to as comprising a novel manual of small keys (whose approximate uniformity of ivory drop is assured merely by reason of their smallness and/or the slightness of their drop) conveniently shortened, say to about two octaves, and registered for chimes or other solo or specialty stop. Heretofore organists usually have had to dedicate a whole hand to the playing of single or successive single note passages on chimes, leaving only the other hand available for manual accompaniment. This has been due to the distances from keys of one manual to those of the one next above, especially its black keys.

Accordingly, a principal object of the invention is to provide, subject to fullfillment of the three requirements enumerated in the next succeeding paragraph, a manual (hereinafter referred to as an "auxiliary" manual) having its black keys, as well its white ones, so locted at and with respect to the rear of a conventional or other manual of larger or full sized keys (hereinafter referred is to provide, subject to fulfillment of the three inches white key ivory length, that a finger of a hand whose other four fingers are in playing position on said main manual can with facility reach to strike a black key on said auxiliary manual. (Hereinbelow "rear," "rearmost," "back," or etc., and "forward," "front," "foremost," or etc., will have reference unless otherwise indicated to the manual or console, rather than to the player or his fingers.)

Said three requirements, fullfillment of which is essential to satisfactory achievement of said principal object, are: I, Provision for safety from accidental actuation of keys of said auxiliary manual in the course of fingering keys of said main manual; II, provision for safety from accidental actuation of keys of said main manual in the course of fingering keys of said auxiliary manual; and III, provision for minimizing the sacrifice of playing surface of keys of said main manual incident to the locating of said auxiliary manual in its aforesaid position, and preferredly restricting said sacrifice to not over 1⅝" or, more preferredly, not over 1 1/16" (measured from the rears of the black ivory caps carried by said keys).

With more general emphasis the invention has as still further objects: To provide novel electric switch arrangements and means for actuation thereof, e. g. by link means running from the ivories to remote points longitudinally of the manual; and novel means and accessories for facilitating portability of manuals and their appurtenances, including novel means for installing and securely supporting them in playing position without entailing derangement, defacement, or alteration of existing console installations.

Still further objects will become implicitly or otherwise apparent on full inspection of the disclosure; and the novel means for attaining the objects of the invention will become apparent as the description proceeds.

In the drawings (in or in respect to which suitable electrical insulation is to be understood as provided in conventional ways, wherever needed; all organ keys or electrical means operated by them as provided with suitable electrical inlets and outlets; all ivories, keys, and flexing or moving-contact surfaces and parts as being optionally subject to modification to give them or enhance their individual replaceability; all vibratory or oscillatable lever, switch, spring or other moving parts as provided, when needed, with suitable damper or stop means as well as with felting or other sound deadening means; all parts as being given fitting anchorages and housings; all figs. as being basically diagrammatic; and all expressions such as vertical, horizontal, downward, upward, lateral, longitudinal, etc., as being relative and approximate unless otherwise evident), to be more particularly described later on.

Figure 1:
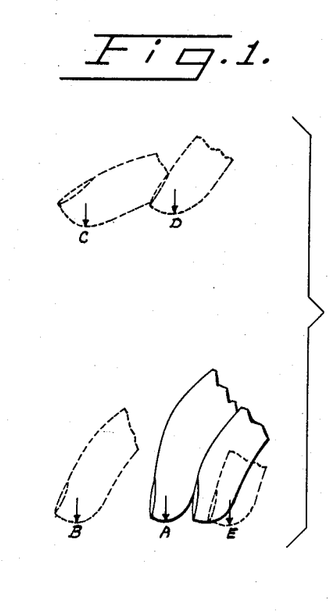
Fig. 1 shows the 3rd finger (with 2nd finger along side) of a player's hand in playing posture, as if on undepressed rear portions of a main manual, with the path of the 3rd finger tip during conveniently full raising and lowering thereof indicated, together with approximate rearward and forward corresponding limits for convenient reaching by the 3rd finger, i. e. in the absence of substantial translational movement of the forearm or bending under of the first joints of other fingers to an awkward degree.
Figure 2:
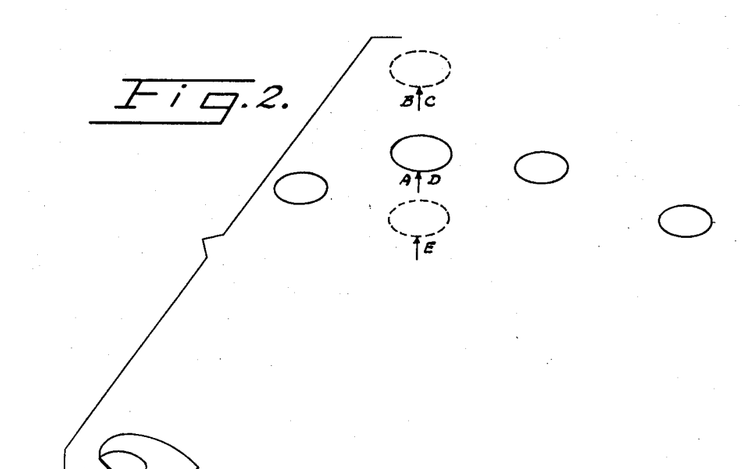
Fig. 2 is a top view showing the finger contacted areas of Fig. 1.

Referring to Figs. 1–2: The filed drawing of Fig. 1 is a life-size sketch of an approximately average hand of an adult organist, the index (i. e. "second") and third (i. e. "middle") fingers being disposed as if in playing posture with the tip of the third finger, e. g., touching the line formed by the rear of the top surfaces of the undepressed black keys of a main manual, and the point A representing this point of contact of the finger with the black key top. When, without appreciable change in posture or position of the rest of the hand, said finger is raised, it will be noticed that the point in question normally moves in a substantially vertical direction, until it reaches a location in the vicinity of D. Or—and without need for substantial translational movement of the forearm or excessive bending under at the first joints of the other fingers—said finger can with facility be selectively moved as far rearwardly or forwardly as to bring the point A approximately into coincidence with B or E, respectively, or with C, if coupled with raising.

By placing the hand in playing posture with the thumb and other fingers contacting the solid line areas of Fig. 2, the observation readily can be made that the positions, extents and directions of the motions of the 2d, 4th and 5th finger tips, when substituted for the 3rd, will tend to approximate the above stated ones of the latter.

It therefore can be seen that the narrow zone limited by vertical planes through B and E and by a horizontal plane through D (outside or preferred range limitations being set out below) affords a particularly desirable location for the line of the frontmost points of the top or playing surfaces of the ivories (both black and white) of the hereinabove mentioned small keys manual, if it were not obstructed, e. g. by structure such as the forwardly jutting white key fronts of a manual next above, as is the case with conventional pipe organs minimization of which sort of structure is called for by No. 3 of the hereinabove enumerated requirements.

Since Fig. 1 as filed is life-size, i. e. full scale, inspection of it will show that the respective distances from B, D and E to A are approximately ⅞, 3⅛ and ⅝ inches. In the more preferred defining of the aforesaid narrow zone however, the B to A and E to A distances will be foreshortened to about ⅝ (better ⅜) and $\tfrac{7}{16}$ inch respectively.

As stated hereinbelow, the fronts of the playing surfaces of the white keys of the small keys or auxiliary manual may, if desired, advantageously be placed up to one inch forward of the fronts of the black keys of said manual. In such case, and with said black fronts placed forwardly of A, up to ⅝" or, more preferredly, $\tfrac{7}{16}$", said white fronts will be located forwardly of A a distance of not over 1⅝" or, more preferredly, not over $1\tfrac{7}{16}$".

On the other hand, and also as stated hereinbelow, piano and organ consoles generally have casing structure (hereinafter referred to as a riser) extending upwardly from a stop rail that overlies the main manual key levers just rearwardly of their ivories; which riser, unless specially modified, will preclude use of such space as it may occupy for placement of the auxiliary manual's keys and associated parts.

Accordingly, in instruments where such a riser exists, the preferred zone within which to confine the entire playing surfaces of the auxiliary manual's keys, black as well as white and in all positions of use, will be that space which is bounded at the bottom by the plane which includes those portions of main manual black ivory tops, when undepressed, that directly underlie said auxiliary manual, at the top by the horizontal plane which is 3⅛" above the line formed by the rears of said tops, at the rear by a first vertical plane which includes said line, or by the front face of said riser (whichever is further forward) and at the front by a second vertical plane which is located not over 1⅝" (more preferredly not over 1 7/16") forwardly of and parallel to said first vertical plane.

The special significance of said 1⅝" and 1 7/16" preferred limits arises from the fact that piano and organ black ivory caps customarily are only 3½" in length (plus or minus a small fraction of an inch in certain models), so that the presence of any low lying and forwardly extending structure over their rearward portions, that renders substantial areas thereof inaccessible to a player's fingers, creates a proportionately highly critical situation. This of course is because a player's technique, having by years of practice become a matter of instinct or "second nature," is predicated generally on free and untrammeled access to the full playing surface of the ivories; wherefore any object encroaching on that access had best be placed as far rearward as possible.

It will be noted that said 1 7/16", if measured slightly scant (1/96" to be exact) divides the length of the usual 3½" black ivory cap into two simple fractions, ⅖ toward the rear and ⅗ toward the front. Accordingly, an alternative way of expressing the aforesaid most preferred limit of up to 1 7/16" would be to say that it calls for all structure of the auxiliary manual to be located rearwardly of the vertical plane which is parallel to the line formed by the fronts of the black ivory caps (at their base) and is rearward of said line a distance equal to ⅗ the length of said caps.

While this preferred arrangement per se insures complete non-sacrifice of the forward ⅗ of the main manual's block ivory caps and to that extent directly aids fulfillment of No. 3 of the aforesaid requirements, it of course will also contribute to fulfillment of Nos. 1 and 2 thereof. In other words, the farther rearward the auxiliary keys are placed—other things being equal—the less will be the danger of accidental fingering of them or of keys of the main manual during use.

Irrespective of how far forward auxiliary manual parts may be placed, however, the invention provides further expedients for contributing to fulfillment of said requirements Nos. 1 and 2. These include, e. g., use of pistonlike keys disposed for substantially horizontal reciprocatory travel; or use of keys pivoted on relatively high fulcrums and so disposed that their finger contacting surfaces extend approximately directly downward from, and their key bottoms (i. e. key beds) directly underlie, said fulcrums; and/or the placing of guards in overlying position above the main manual to act as barricades against stray components of finger movement, which guards (or other elevated structure) may also serve to restrict the aforesaid travel to levels well above the main manual.

Exemplifications of these and related expedients will be found among Figs. 3–37, presently to be described in detail.

Figure 3:
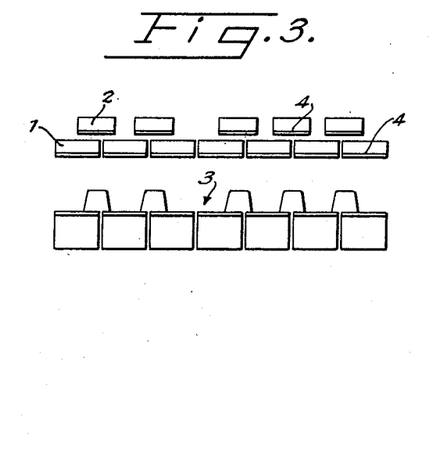
Fig. 3 is a front view of a portion of a main manual with presently preferred forms of ivories of a novel small key manual such as above mentioned in advantageously novel locational arrangement at and above its rear.

The filed drawing of Fig. 3 is substantially a ½ scale front view representation of a c to b section 3 of a standard piano keyboard, with playing surface portions or ivories 1 and 2, respectively, of the small key manual white and black keys, in conventional chromatic sequence at preferred locations above the section. The main manual black keys here shown are of uniform height. If they sloped downward toward their rears the small key manual front top lines would be correspondingly lowered.

Having the black keys considerably above the white ones permits greater width for each kind, by reason of open space thereby provided between their levels.

Figures 4, 5, 6, 7, 8, 9:
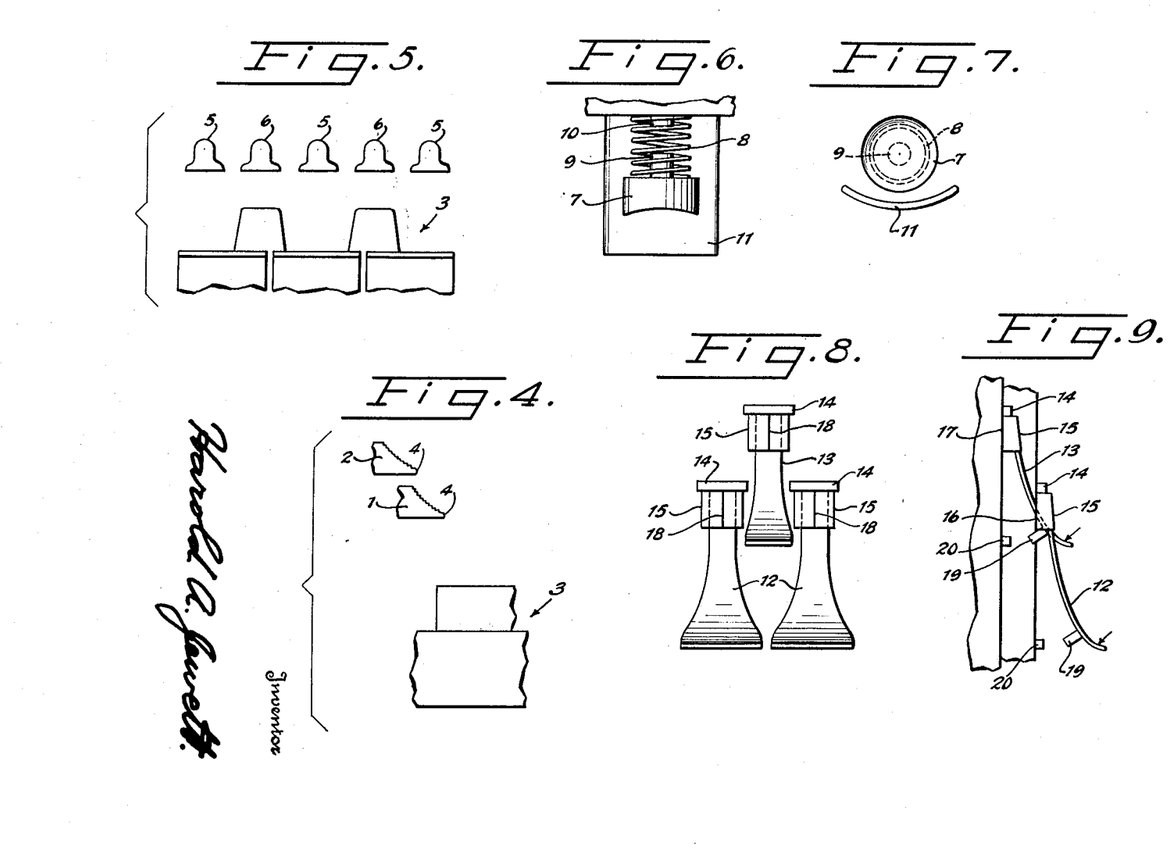
Fig. 4 is an end view of Fig. 3.
Fig. 5 is analogous to Fig. 3, except for differences explained below.
Figs. 6–7 are details showing a push button or piston type of key with a troughlike finger rest or guide for supporting the finger tip during horizontal pushing of the key.
Figs. 8–9 are front and side view details, respectively, showing separately replaceable depending curved strip spring key pieces adapted, on finger pressure at their lower ends, to adjacently close terminals of tone-producer actuating circuits, and on release of such pressure to open them.

Fig 4, being an end view of Fig. 3, shows horizontal staggering of the two rows of keys, not only to supplement the above purposes of the vertical staggering, but to further provide for ease of manipulation in playing. The upward sloping of the ivories (shown as moderately concave but which might be either flat, convex or irregular, as well as uniformly roughened to enhance sureness of touch) also facilitates such manipulation.

The front top lines of both 1 and 2 in the case of Figs. 3 and 4 are of course at the upper edges 4 of the vertical facings of their bevelled leading portions.

While the circumstances of a particular installation may dictate omission of either vertical or horizontal staggering, or of both, it generally is preferred to have from about 3/16 inch to about one inch of each, measured from the line of the fronts of the playing surfaces of the lower row of keys of the small key manual to that of the other ("stagger" here meaning the distance between the respective horizontal planes, in the case of vertical stagger, and that between the respective vertical planes, in the case of horizontal stagger, in which said lines lie).

It also is usually advantageous to have said lines lie in a common plane which slopes upward rearwardly at an angle of at least about 15 (preferably from 30 to 75) degrees.

Fig. 5 is analogous to Fig. 3 (though only a c to e main manual section is used for purposes of illustration), except that the ivories 5 and 6 of both white and black keys have been brought into the same horizontal plane as well as the same vertical alinement, while being given narrow or peak-shaped tops to minimize risk of unwanted depression of more than one of them at a time by a single finger.

Fig. 6 is a top view of a horizontal piston or push button form of key 7 (for use in chromatic series) which, on being pushed against spiral spring 8 brings tone producer actuation circuit closing terminals 9 and 10 into contact. The horizontal finger tip guide or support 11 which advantageously may be troughlike, is disposed subjacently to the key so as to furnish a rest for the finger during its exertion of horizontal pressure (particularly if sustained) on the key, as well as a guard against accidental actuation.

Fig. 7 is a front view of Fig. 6.

The Figs. 5–7 forms of keys are particularly useful where it is desired to minimize the vertical extent of the space occupied by the manual.

Figs. 3–7 are to be understood as adapted for use either with conventional organ key or piston actions (not shown) extending rearwardly into the interior of a console, or with novel key actions such as hereinafter described.

In either case the individual electrical conduits leading from the respective keys as well as those leading to them (one of which groups may of course be a common main—negative or positive as the case may be—and e. g. consisting of or being a part of, or integral with, the key frame.

of the manual) are to be understood as disposed in juxtaposition, e. g. collected in a cable along the manual and advantageously in front of the usual riser or fall board structure which constitutes the facing of the portion of the piano or organ console casing just above and at the rear of the usual manual. ("Key frame," as used herein, designates the member on which the keys are installed or hung, while "key bed" or key bottom" designates the member limiting the depression of the keys in playing. The "key frame" and the "key bottom" may be synonymous in certain embodiments, or they may be at an angle—e. g. right—with each other, in others.)

Figs. 8-9, being front and side views respectively, show white key pieces 12 and a black key 13, each having shoulder pieces 14 which, on being placed in the positions shown, overhanging supporting sleeves 15 affixed to upright backing members 16 and 17, serve to hold 12 and 13 at the desired elevations. For convenience in installation the sleeves 15 may be provided with seams 18, permitting bending of the ends forming the seams outwardly in preparation for placing the shoulder pieces 14 in position, and thereafter rebending the ends into the positions shown in the drawings. If desired, a fastening link (not shown) may then be fitted over the seam portions to secure them against unwanted opening, or other suitable fastening means applied to the same purpose. The pieces 12 and 13 may be made of strip spring steel, e. g., and sleeves 15 of any suitable material—advantageously hard metal (all parts being provided as aforesaid, with appropriate electrical insulation which may be conventional and is not shown).

Finger pressure on the lower tips of 12 and 13 (cf. arrows in Fig. 9) operates to close toneproducer actuating circuits through terminals 19 and 20; the resilience of the spring material of 12 and 13 serving to reverse the process on release of the pressure.

In place of such resilience a key piece weight distribution appropriate for gravity-effected return from circuit actuating position (i. e. with the key piece being swingably suspended from an axle member above) may be used. In such case a stop member is placed in a position to halt the swing of the key piece (consequent on release of finger pressure) enough short of plumb to damper pendulum action. Players generally are so used to spring-supplied or other resistance to their finger pressure in playing, however, that it is believed most will not wish such resistance omitted; and with it present the said gravity deactuating effect will inherently be supplemented.

Figures 10, 11:
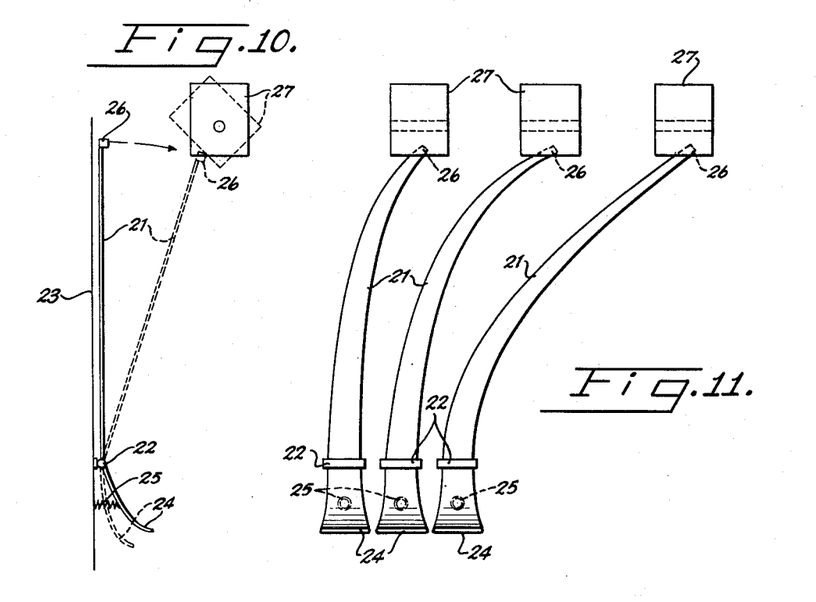
Figs. 10–11 are end and front views, respectively, of a modification in which the spring keys of Figs. 8 and 9 are respectively replaced by a bell crank lever so fulcrumed that pressure at its lower end causes amplified motion of a circuit closing member at its upper end.

In connection with the terms "key return agencies" and "motion limiting guides" appearing in the appended claims, it will be noted that a portion of the key itself may serve as the key return agency, whether via inherent resilience as in the case of the upper or anchored end portions of key pieces 12 and 13 in Figs. 8-9, or via weight distribution as pointed out in the preceding paragraph; while the anchorage of the key may serve as a motion limiting guide, as exemplified by supporting sleeves 15 in said figures or axle 22 in Figs. 10-11, presently to be described.

Fig. 10 is a side view showing a bell crank lever 21, made of light rigid material, rotatable about axle 22 affixed to riser 23, in response to finger pressure at the playing surface 24, which also serves to compress spring 25. The upper arm of lever 21 being several times longer than the lower one, its terminal point 26 traverses a correspondingly greater distance than surface 24, before actuating mercury switch 27. If, instead of tipping a mercury switch, point 26 be made one of the circuit closing contact points of a non-mercury switch, or to actuate one of them, the advantage will be the same, where the particular installation calls for a fairly large separation of the two contact points and there is ample available space well above the rear of the main manual but very little at its level (e. g. with lessening of arcing trouble by amplification of speed of separation, to increase the life of contact points, or etc., as special desiderata).

Fig. 11 is a front view of Fig. 10, illustrating how (e. g. in case the manual has relatively few keys) progressively increased lateral curvatures in the upper portions of levers 21 can still further increase the room between successive switches.

It is to be borne in mind, however, that merely an elevated location for the switch, without more—i. e. as compared with a location below or near the level of the finger contacting portions of the keys—may be the determining factor; also that in Figs. 10 and 11 as well as other switch actuations herein shown, suitable overall housings (e. g. carried by the key frame, its supporting structure, or the console) are contemplated.

Figure 12:
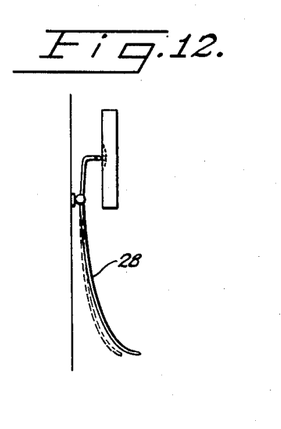
Fig. 12 is a side view of a similar bell crank key, except for its having an amplitude ratio opposite to that of Figs. 10–11.

Fig. 12 illustrates a form of bell crank means 26 similar to that of Figs. 10-11 except for an amplitude ratio providing for less motion of the upper tip than of the finger contact tip. This type is useful where a shorter distance is required to be traversed by the switch contact-making member than by the finger pressure portion of the key, e. g. in the case of snap switches. At rest the upper tip may be in contact with such member, and return of the key to rest position on release of finger pressure be effected by its spring action.

In connection with the term "motion limiting—stops" appearing in the appended claims, it will be noted that mere stiffness of a spring may serve as such, as exemplified by spring 25 in Fig. 10.

Figure 13:
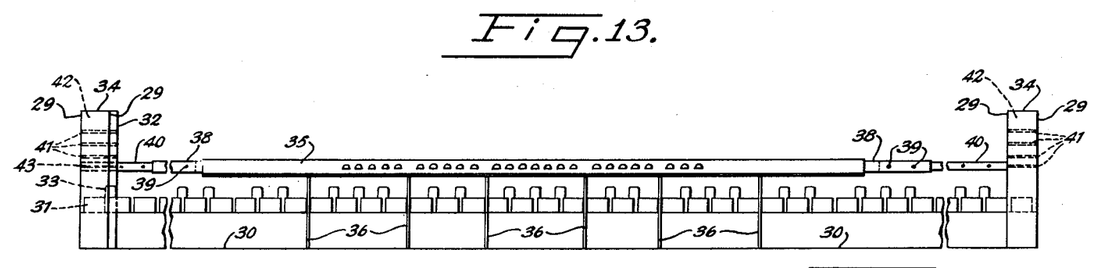
Figs. 13–14 are front and end views respectively depicting suitable forms of adjustable, separately portable, end and intermediate supports for a portable small key manual placed at the rear of, and above, a main manual; said supports using the main manual key bed, via the interstices between its keys, as a base.
Figure 14:
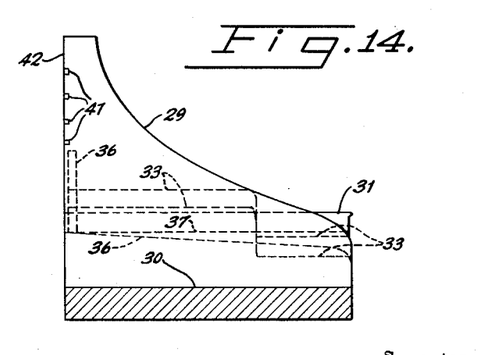

Figs. 13-14 are front and end views, respectively, showing suitable forms of support appendages for intermediate as well as end portions of the manual.

Although choice of support means from among the wide variety available will depend on circumstances and may e. g. include suction, cam, adhesive, or magnetic devices, as well as weighting of parts so as to make the most efficient use of gravity in achieving optimum snugness and security of fit, the forms here shown both avoid any necessity for making physical alteration of an existing main manual installation and capitalize on the existence of recurrent vertical interstices or seams between keys thereof at standard or uniformly customary distances of about $10\frac{3}{12}$ inch (the interstices themselves occupying about $\frac{1}{16}$ inch of each such distance), in the case of the relatively broad front portions of white keys, or at standard or uniformly customary distances about $\frac{7}{12}$ as large (i. e. 12 instead of 7 per octave of standard—i. e. about $6\frac{7}{16}$ inches—length) in the case of the portions of all keys lying rearwardly of said front portions.

These seams leave vertical paths open to the key bed or other subjacent structures of the main manual. Hence, by sounding for their depth and contour (e. g. by resting a thin measuring card uprightly in the seams) a form-fitting base for a support having a vertical rear edge can readily be designed, which rear edge will lie in substantially the same vertical plane as the upright surface (above it) of the key frame of the new manual (the latter and the supports being optionally separable or integral with each other).

Referring to Figs. 13 and 14 in particular, walls constituting such supports, 29, rise vertically from the main manual key bed 30 at each side of white key 31 at the bass end of the manual, and wall 32 similarly rises alongside adjacent black key 33. These walls, together with wall 34 rising through the seam between the front of key 31 and the usual front rail or analogous structure of the console (not shown), form a vertical support on which key frame 35 of the small keys manual may be supported. Walls corresponding to 29 and 34 are designated by like numerals at the treble end of the main manual.

One or more similar supports 36 may be placed in any b—c or e—f white key seams along the main manual, but as shown in Fig. 14 the upper edges of their base portions should terminate below the level 37 of the tops, when fully depressed, of the white keys, and the rear-to-front thickness thereabove should be small so as to obviate interference with finger action during playing.

Sheet steel or rigid plastic, e. g., is suitable for walls 29, 32, 34, and supports 36, with the cross-section of the latter diminishing to about that of umbrella wire as it emerges above level 37.

Separable extension parts 38, provided with holes 39 spaced from each other at seam-to-seam distances, and 40, provided with similarly spaced studs for fitting into said holes, illustrate means for longitudinal adjustability; while horizontal slots 41 in rear facings 42 of the vertical support structures at the ends of the main manual, together with complementary ridges 43 in the outer end portions of parts 40, illustrate analogous means for vertical adjustability.

Electrical inlet and outlet conduits (not shown) for switches located at or near the keys, are led, e. g. in a cable, to one or both ends of the manual. Such cable, if the conduits be insulated by nylon, can be extremely small in cross-section.

Advantageously the cable may connect into a multiple coupling (not shown) of the transposer type, so as not only to provide severability at whatever point may be desired (e. g. as an aid to portability) but also to provide convenient means for conforming the pitch of the small manual's tone producers to concert, international, or other pitch, as the case may be, to which the main manual's tone producers may have been tuned.

Among various expedients other than those mentioned or described above, for providing support means for the small manual, may be mentioned that of fixing the lowest and highest main manual white keys in non-depressable, non-tone producing position, and then using their tops as bases on which to rest end support members.

Key frame 35 may be a single elongate rigid member having a vertical rear facing for fitting flush against the usual fall-board or other flat riser member at the rear of the usual main manual, and having as well a vertical front facing on which the small manual keys may be hung or otherwise affixed; or it may consist of two such members, one for black key installations and the other for white, each depending vertically, e. g., from a top portion of 35. (Fig. 9 illustrates an occasion for such a construction.) In addition, when the keys operate by downward pressure, a horizontal shelf to serve as a key bed or bottom may project from 35.

Variations and details of designs to accommodate particular key structures, actions, and accessories may readily be formulated in view, e. g., of Figs. 3–12 hereinabove and Figs. 15–36 hereinbelow and the installational elements shown or implicit in them.

Figures 15, 16, 17, 18, 19, 20, 26, 27, 28:
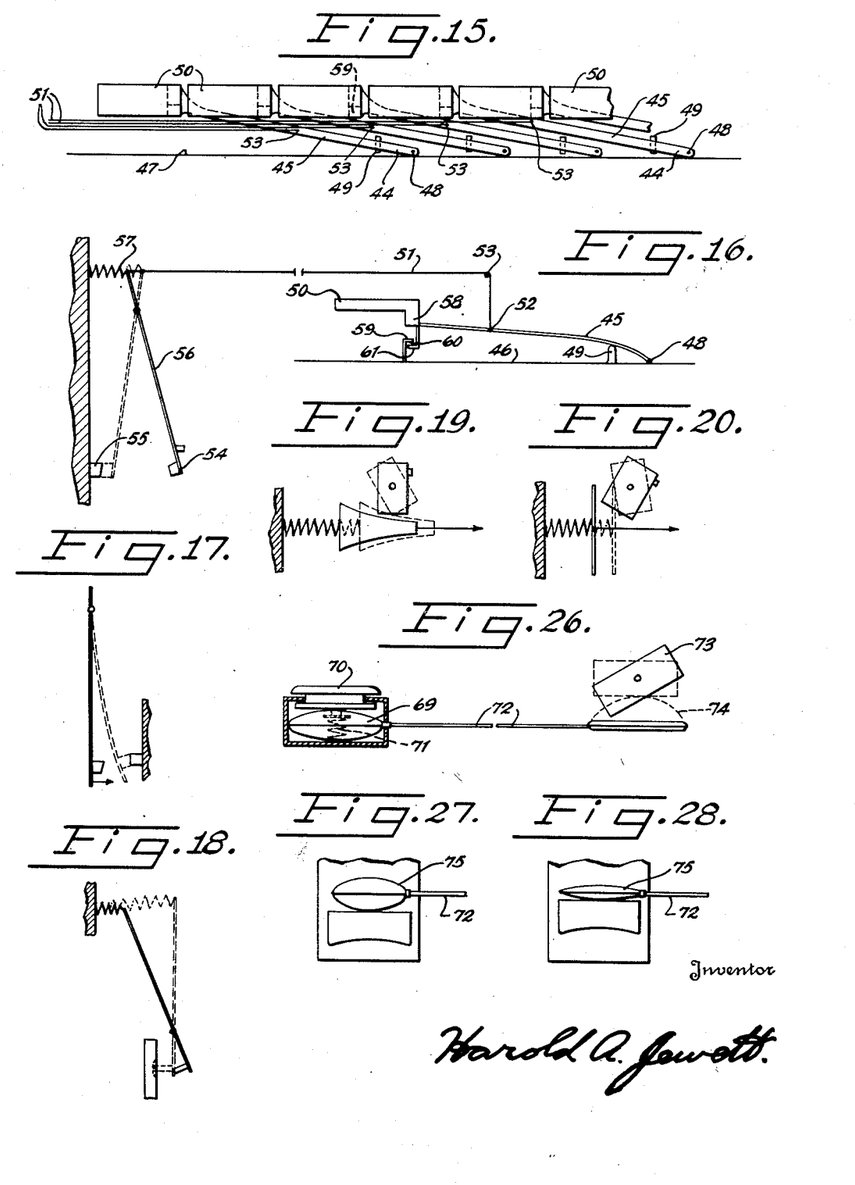
Fig. 15 is a top view of an illustrative number of successive keys which, on being pressed, impart translational motion to links which thereby operate remotely located switches.
Fig. 16 is a rear elevation of such a key and its link connection.
Figs. 17–20 are illustrative of some of the various switch actions available for use in the practice of the invention.
Figs. 26–28 are details of pneumatic keys and inflatable switch-actuating members operated by them through the medium of air filed tubes leading from the former to the latter.

Thus, Figs. 15–16 illustrate the provision of a spring-board type of key anchorage by affixation of stationary ends 44 of key arms 45 to horizontal key bed 46 jutting from key frame 47, by means of pins 48 and fulcrum members 49. On depression of an ivory 50 a longitudinal link 51, anchored to the arm at point 52, is pulled downward over guide pin or roller 53, as shown more particularly in Fig. 16, thereby imparting translational motion to the horizontal portion of link 51 so as to bring tone producer circuit closing terminal 54 into contact with co-acting terminal 55 through lever means 56. Release of pressure on the ivory permits spring 57 to return the parts to their starting position, through use of suitable spring steel for the arm 45 will give it such resilience that it alone can serve that function, i. e. without need for spring 57.

The vertical portion 58 (cf. Fig. 16) of key arm 45 serves to elevate the finger-contacted part 50 sufficiently so that depression thereof until it seats on stop member 59 nevertheless does not bring it into contact with an adjacent key; and the under surface 60 of member 59 serves, in co-action with elbow piece 61 downwardly depending from portion 58, as shown, to dampen any vibratory effect.

Only the short portion of a link 51 which reciprocates about the guide 53 need be flexible. Rigid non-stretching rods, with flexible segments only at such portions, therefore are appropriate for the links. Or textile material such as nylon or other sewing thread (nylon being highly wear-resistant) may be used to advantage, e. g. if provided with a fine metal core to insure against stretchability. Likewise, small metal chains are suitable, or thin bands of lock-spring steel.

The staggering of the keys as shown in Fig. 15 both conserves rear-to-front manual space and minimizes structure between ivories 50 and the main manual ivories below them.

The guides 53 may be carried by horizontal supports (not shown) projecting from the key frame at an elevation such as indicated at 53 in Fig. 16, or by vertical supports rising through openings (not shown) adjacent link anchor points 52 in arms 45, or in other suitable ways, the main consideration being to space the guides (as indicated in Fig. 16) so that they will co-operate with tautness of the links to keep the latter in parallel arrangement. A plurality of tiers of the links may be used where called for by the number of ivories to be served; or, e. g., half may be led toward one end of the manual and half toward the other. Such expedients are to be understood as likewise available in analogous embodiments disclosed herein.

Figs. 17–20, it is believed, need no additional explanation.

Figure 21:
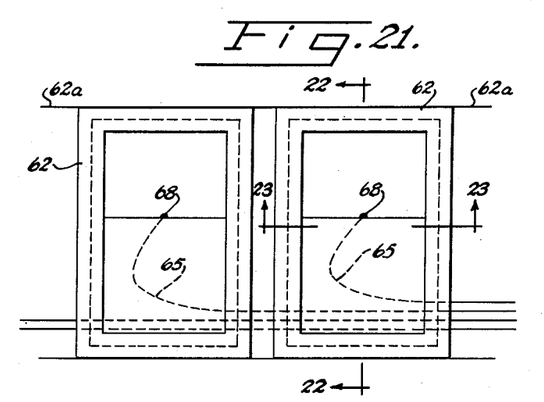
Figs. 21–25 are details illustrating the type of push button or piston key depicted in Figs. 6–7 but with provision for flexible link connections to switches located remotely, say beyond the end of a manual, rather than adjacent the piston.
Figure 22:
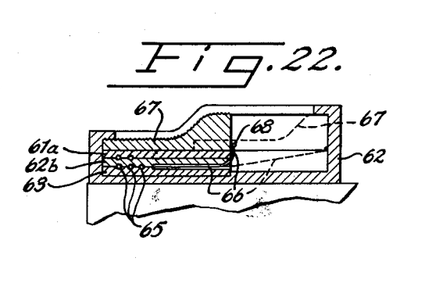
Figure 23:
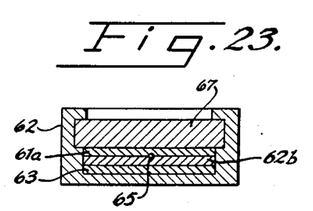
Figure 24:
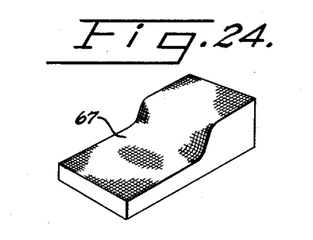
Figure 25:
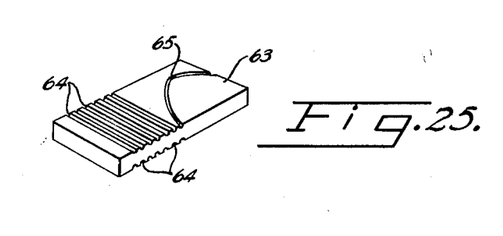

Figs. 21–25 are very much enlarged vews of small manual key structures designed to pull links when slide portions to which the links are anchored are pushed horizontally inward (or upward, or both, depending on the angle at which they are supported), Fig. 21 being a plan view of two adjacent such keys, Fig. 22 a section of one of them taken along the lines 22—22 of Fig. 21, Fig. 23 a section taken along the line 23—23 of Fig. 21, Fig. 24 a perspective of the slide portion of a key, and Fig. 25 a perspective of a stationary part containing portions of guide channels through which the links reciprocate.

In particular, stationary frames 62 (Figs. 21—23), resting on or against a key bed 62a, house stationary laminae 61a, 62b, and 63 (Figs. 22—23) which contain complementary channel portions 64 (Fig. 25). When placed one above the other in the manner shown in Fig. 22 these laminae provide guide channels or paths 65 for the links. Through the innermost channel of each key passes the link 66 (Fig. 22) which is anchored to its particular slide member 67 (Fig. 24) at point 68 (Figs. 21—22), while the remaining channels permit reciprocation through them of links connected to slide members of keys nearer the middle of the manual.

Advantageously the finger-contacting surface of slide member 67 is knurled or roughened (Figs. 22 and 24) to provide a good "footing" for the player's finger tip. Or it may be surfaced with "Ludox" (described in the Du Pont Magazine for September–October 1948, on pages 12–13), to insure against excessive slipperiness. If the particular installation is such that slide member 67 is operated by an upward pressure this is especially helpful, though generally speaking, it is desirable to provide sufficient roughness or thickness of "Ludox" surfacing to preserve a suitable degree of such "footing" even when the ivories are wet or freshly washed.

The curvature of the link guide channels at the parts to which their numbers, 65, are directed in Figs. 21 and 25 minimizes friction between link and channel and compensates for the one-sidedness of the pull incident to the fact that the main portion of the link reciprocates at right angles with and to one side of the direction in which the member 67 reciprocates. Also, it facilitates use for links 66 of flat, lock-spring steel or other similar flexible but strong material, of sufficient thinness to permit location of a large number of channels 65 in a key.

The spring at the switch end (not shown) of the link operates to return the slide member to starting position on release of finger pressure. Or, a supplementary return spring (not shown) may be disposed inside the rear of frame 62 (at an appropriate angle to minimize any friction between slide member and frame) to aid in effecting such return.

Fig. 26 shows a bellows 69 compressible by downward pressure on key 70 against resistance of spring 71 to cause a surge of air through conduit 72 leading to tiltably operated remotely located tone-producer actuation switch 73. Dash lines indicate the contour of a bag 74 at the switch end of the conduit when inflated by said surge, together with the resulting position of a switch actuated thereby. When the conduit is a flexible tube (advantageously of very light natural or synthetic rubber or plastic) it can be directed to switches located at a wide choice of places, e. g. the floor, the top of the console, another room, or etc.

Figs. 27–28 illustrate normal (inflated) and deflated positions of a simple rubber bulb 75 which may be used, per se, as the ivory (i. e. without the parts 70 and 71 of Fig. 26) and, like the Fig. 26 and other embodiments may be disposed for actuation by horizontal and/or upward pushing (e. g. resting on finger supports such as those of Figs. 6–7).

Figure 29:
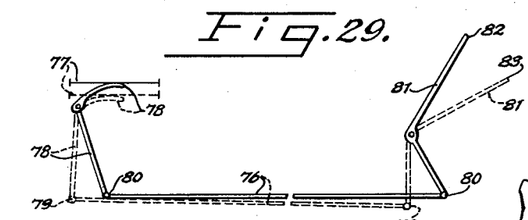
Figs. 29 and 30 illustrate, respectively, quadrant and rotatable rod means available for communicating down motion of keys to remotely located switch means; spring or other key return means being implied if not shown in all such cases.

Fig. 29 depicts use of a rigid link 76 to transmit down motion of ivory 77, converted by quadrant 78 into amplified substantially horizontal link motion indicated by numbers 79, 80 to bell crank 81, which by reason of the difference in the lengths of its arms further amplifies the motion as indicated by numbers 82, 83. The function of the tip of the longer arm of bell crank 81 is similar to that of part 26 of Fig. 10, already described.

Figures 30, 34, 35, 36:
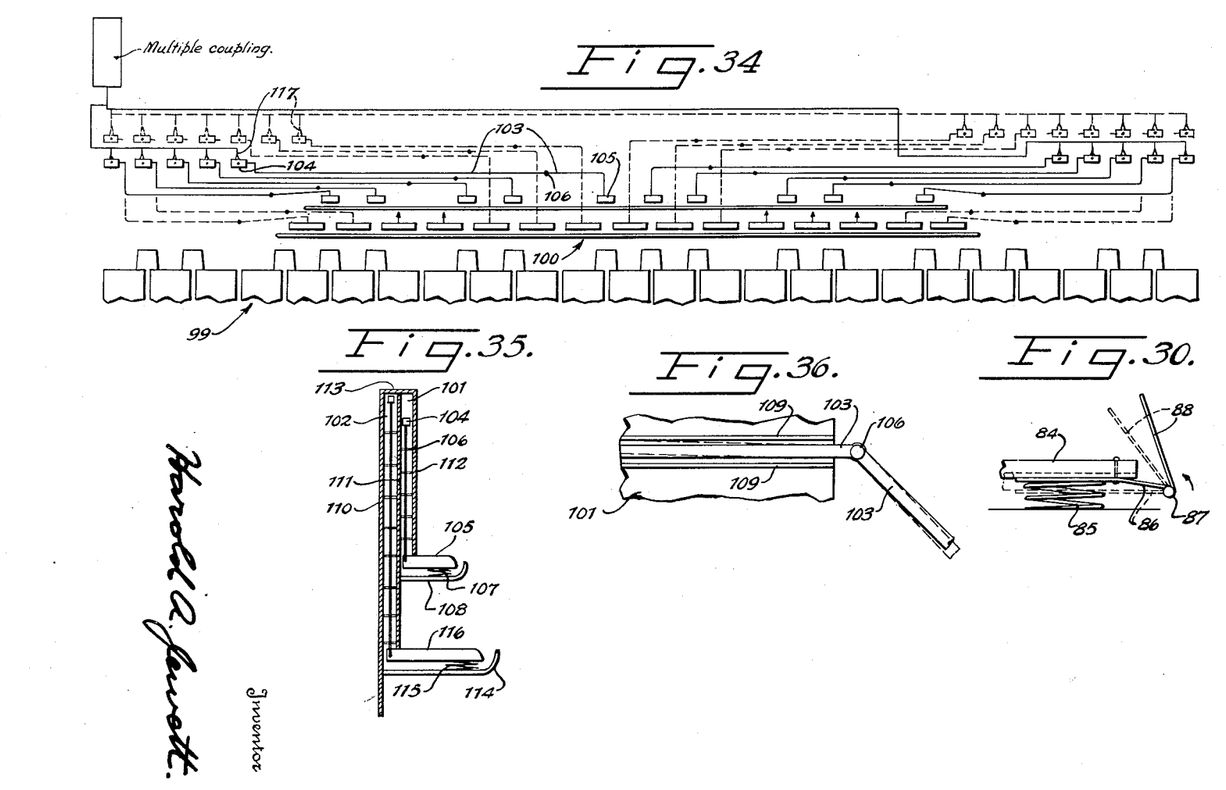
Figs. 34–36 illustrate the use of rocker links in place of the translational motion or pneumatic links.

Fig. 30 indicates a still further form of rigid link means available for translating ivory down motion into switch actuating motion of a remotely located member. That is, in response to pressure on ivory 84 (against return spring 85) causing ivory support arm 86 to rotate link 87 counterclockwise, arm 88 at the far end of the link is moved according, to actuate a switch (not shown).

Figure 31:
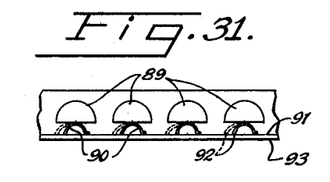
Figs. 31–33 depict crescent spring mechanisms useful for the same purpose.
Figure 32:
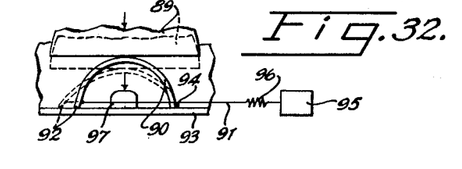
Figure 33:
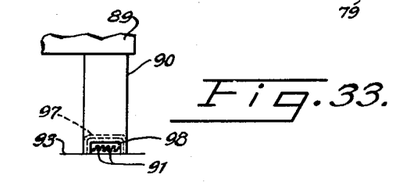

Figs. 31–33 illustrate means operable with either rigid or flexible links, for converting ivory down motion into flattening of a crescent spring with consequent horizontal motion of a free end thereof, such latter motion being available, via the links, for remote switch actuation.

More particularly, Fig. 31 is a front view of a series of ivories 89 of the Fig. 5 type held up by crescent springs 90, while Fig. 32 is a detail of such ivory-spring combination showing link 91 affixed to free end 92 of spring 90 which is anchored to key bed 93 at its other end 94. Down motion of 89, causing horizontal motion of 92, as shown, pulls 91 to actuate switch 95. Spring 96 operates to restore 91 to its starting position on release of pressure on 89, while contraction of crescent spring 90 at the same time operates to raise 89 to its undepressed position.

Stop member 97, shown in Figs. 32 and 33, limits down motion of ivory 89 and spring 90 to prevent their seating on the group of links which rest on key bed 93 and reciprocate through opening 98 (Fig. 33) in stop 97.

It will be apparent that embodiments of Figs. 31–33 and other figures described above (e. g. Figs. 26–28) can be conveniently installed where only a fraction of an inch of vertical space is available, as for instance just between the row of registration pistons at the rear of a conventional "great" manual of an ordinary two-manual pipe organ and the underside of the "swell" manual white keys (when depressed) immediately above it. In particular such cases, however, it may be found desirable to dispose the crescent springs and the ivories, their stops and the links, for operation by horizontal rather than downward pushing, in which event their key bed will be rotated 90° (consequently fitting flush against the key frame so as, if desired, to be integral or synonymous with it).

Figs. 34–36 introduce the principle of a rocker link to convert ivory down motion into switch actuating motion at or toward the end of the manual. Where there is a riser of ample surface and height at the rear of the main manual this embodiment is particularly useful, as it reduces wear to a minimum.

Fig. 34 shows a portion of a main manual 99 with a g to g two octave small keys manual 100 installed at its rear; each ivory of the latter being carried by one end of a rocker (except that for clarity in the drawing the presence of such rockers for low $e$ and $f$ and high $c$, $d$ and $e$ is indicated merely by arrows). Fig. 35 is a relatively enlarged and exaggerated end view of the small manual, depicting the arrangement of black key rockers (shown by solid lines in Fig. 34) in a front housing 101 and white key rockers (shown by dash lines in Fig. 34) in a rear housing 102.

Since the action of each rocker is identical in principle with that of the others a description of one, 103, will suffice for all. It may be made of material on the order of coat-hanger wire, umbrella wire, or if of rigid steel having a diameter considerably less than ⅛ inch, essentially the only stress to which it is subjected being the force necessary to tilt mercury switch 104 at its outer tip when, by down pressure on ivory 105 at its other end, it is rocked about axle or fulcrum 106. In undepressed position ivory 105 is held up by key return spring 107, and advantageously the ivory drop (limited by key bottom 108), is very small, say about 1/16 to ⅛ inch. This smallness of ivory drop is one of four main factors contributing to the provision of rocker to rocker clearance during playing, despite a minimum of vertical housing dimension, the other three being the expedients of using: a plurality of housing; vertical staggering of fulcrums; and slenderness of rocker cross-section.

Any substantial downward blow on the ivory will be absorbed by the key bottom or bed rather than the rocker, except that rapidity of rocking motion imparted to the rocker by the blow will be limited and confined by suitable oscillation dampening means, e. g. ridges 109 on the inner facings of the housing walls (cf. Fig. 36).

Such ridges, as well as studs for the fulcrums or axles may conveniently be molded into the walls, if the latter be of metal or plastic. In such case assembly may be effected by laying the rear wall 110 (Fig. 35) of the rear housing inner face up, on a flat surface, then placing the white key rockers on the fulcrums or axles and in the respective guide channels formed for them by such ridges, next placing the middle wall 111 (having complementary ridges on its rear face) over the rockers, next laying the black key rockers on fulcrums or axles in guide channels formed for them by ridges in the front face of middle wall 111, then laying front wall 112 over them, and completing the assembling by affixing top partition 113 and securing key bottoms 108, 114, return springs 107, 115, and ivories 105, 116 in place.

The horizontal elbow portions at the key end of the rockers may be externally screw threaded to permit ivories having complementary internally screw threaded recesses to be screwed into place on them; or any other suitable method of affixation (mechanical and/or adhesive) shown hereinbelow or known to the art may be used.

Although there is no substantial friction or wear on the guide channels or fulcrums, axles (or other forms of pivots) during normal usage, self-lubricating metal or analogous material is advantageously used for the inner wall facings. Or, since nylon is an especially good material for both molding and bearings, it is particularly adaptable to the instant use. (In fact, it is likewise a preferred material for the ivories and, in sufficiently thick monofil or rod form, for the rockers.)

The switches may be affixed to the key frame (110 extended) at levels above the more distant bass and treble ranges of the main manual, and are provided with electrical inlets and outlets 117 as indicated on Fig. 34.

Since the drawing of Fig. 34, as filed, is only a trifle less than one-half scale (cf. size of its main manual keys), it will be apparent that the combined overall dimensions of the rockers' two housings can be of the order of say, 1½ to 2½ inches high by ¼ to ⅜ inch wide, or even smaller.

Figure 37:
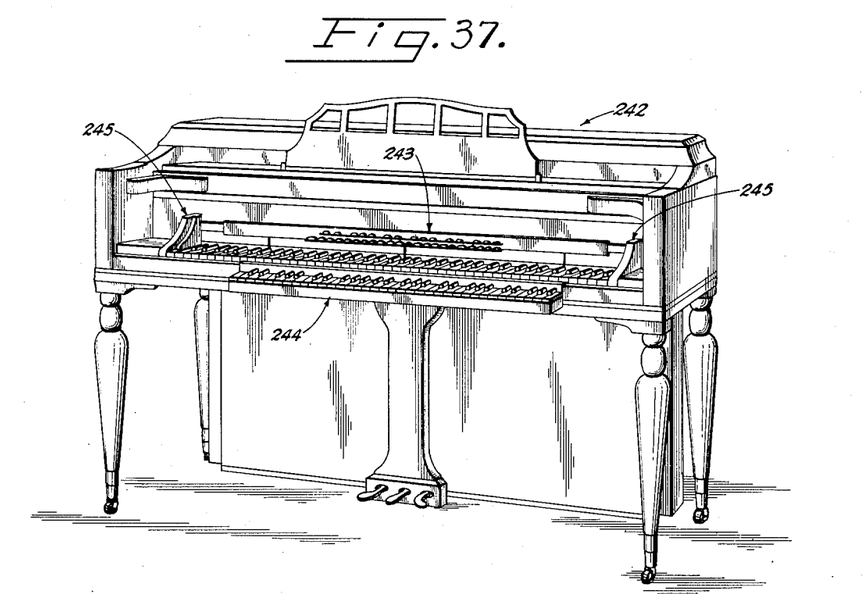
Fig. 37 is a perspective view of a small keys portable manual such as that of Fig. 13 at the rear of the keyboard of a conventional piano, along with another portable manual, of optionally larger and conventionally shaped keys, at the front thereof; the novel support means, key actions and electric switch actuating arrangements, etc., of the invention combinedly contributing to make possible a limitless variety of novel console ensembles offering novel advantages such as herein exemplified.

Fig. 37 exemplifies, in external aspects, the equipping of a conventional console portion of an upright piano 242 with illustrative novel portable auxiliary manuals 243 and 244, the installation and removability of 243 being in accordance with the principles of Figs. 13–14 above, and 245 indicating Figs. 13–14 types of end supports.

Invisibility of links (e. g. pneumatic or electrical conduits) for the auxiliary manuals may be achieved by housing them in narrow channels inside the key frames or appendages.

The manner of installation of manuals 243 and 244 is applicable to their use on console keyboard instruments generally, "console" as herein used meaning the structure supporting and adjacent the manual or manuals of any keyboard instrument of piano or organ type, irrespective of the range of its manual or manuals, so long as they are adapted for being played on by a person seated at them.

Among materials useful in the practice of the invention may be mentioned titanium (when prepared by modern know-how) as well as light but tough and rigid metal alloys, e. g. for the rockers or housings. And long-life synthetic rubber (e. g. "butyl" inner tube type) advantageously can be used for the pneumatic links.

Novel subject matter disclosed but not claimed herein is being claimed in continuational applications S. N. 120,135, filed October 7, 1949; S. N. 206,100, filed January 15, 1951; and S. N. 307,099, filed August 29, 1952.

It will be apparent that many minor changes in the physical embodiments of the invention and its novel aspects may be made within the scope of the appended claims without departing from the spirit of the invention.

I claim:

1. A keyboard musical instrument comprising a main manual having piano-type ivories, a front rail, a key bottom, a stop rail disposed adjacently along the rear of said manual, a riser integral with and extending upwardly from said stop rail, and a portable auxiliary keyboard that removably overlies a rearward portion of said main manual and is operatively independent of the keys of said main manual; said auxiliary keyboard comprising at least one white key and at least one black key, in chromatic sequence, which white key and which black key are provided with key return agencies and motion limiting guides and stops, all of which key return agencies and motion limiting guides and stops, in all positions of use, lie entirely forward of said riser and entirely above the level of directly underlying tops of undepressed main manual ivories; said motion limiting guides and stops also serving to insure, at all times during use, the continuous presence above said level of all portions, both when fully depressed and when fully undepressed, of the finger contacting surfaces of said auxiliary keyboard white and black keys.

2. The instrument of claim 1 wherein all of said key return agencies, motion limiting guides and stops, and finger contacting surfaces, in all positions of use, lie entirely rearward of the imaginary vertical plane which is 1 and 7/16 inches forward of, and parallel to, the line formed by the rears of the black ivories of said main manual.

3. The instrument of claim 1 wherein said portable auxiliary keyboard rests on supports that are based on areas of said key bottom that directly underlie ivories of said main manual.

4. The instrument of claim 3 wherein said supports comprise fin-like struts that seat on said key bottom and rise through key seams of said main manual; said struts also being in juxtaposition to both the rear face of said front rail and the front face of said stop rail.

5. The instrument of claim 3 which comprises connecting means that extend parallel to said main manual and operatively interconnect keys of said auxiliary keyboard with remotely located tone producers.

6. The instrument of claim 4 wherein there are at least three of said struts and the intermediate one of said three is of such thinness as to permit substantially free reciprocation, in use, of keys of said main manual flanking said intermediate one; the upper portion of said intermediate one also being of greatly diminished rear-to-front dimension so as to be substantially entirely out of the way of the fingers of a player during use.

7. The instrument of claim 5 wherein said remotely located tone producers are electrically operable, wherein said white and black keys are provided with electric switches that are respectively actuable by depression of said white and black keys, and wherein said connecting means comprise electrical conduits that operatively associate said switches with said remotely located tone producers.

8. The instrument of claim 1 wherein said auxiliary keyboard comprises a plurality of such white keys and a plurality of such black keys, said pluralities totaling at least thirteen keys, and wherein said thirteen keys are disposed in overall chromatic sequence corresponding to that of an octave of the chromatic scale.

9. The instrument of claim 8 in which said thirteen keys are provided with electric switches that are respectively actuable by depression of said thirteen keys; said switches being respectively provided with electrical conduits that extend parallel to said main manual and operatively interconnect said switches with remotely located tone producers.

References Cited in the file of this patent

UNITED STATES PATENTS

| Number | Name | Date |
|---|---|---|
| 474,016 | Janko | May 3, 1892 |
| 875,815 | Hofbauer | Jan. 7, 1908 |
| 1,004,350 | Bialik | Sept. 26, 1911 |
| 1,300,873 | Reynolds | Apr. 15, 1919 |
| 1,775,330 | Stoehr | Sept. 9, 1930 |
| 1,840,712 | Grant | Jan. 12, 1932 |
| 2,195,238 | Cervenka | Mar. 26, 1940 |
| 2,243,834 | Bonilla | June 3, 1941 |
| 2,459,103 | Adair | Jan. 11, 1949 |
| 2,562,670 | Koehl | July 31, 1951 |

FOREIGN PATENTS

| Number | Country | Date |
|---|---|---|
| 367,908 | Great Britain | Feb. 29, 1932 |
| 520,118 | Germany | Mar. 7, 1931 |
| 542,376 | Germany | Jan. 23, 1932 |